Dec. 16, 1969   J. N. McMILLAN   3,484,820
UNIFORM FINISHING MACHINE
Filed April 8, 1968   9 Sheets-Sheet 1

Fig. 1

INVENTOR
JERRY N. McMILLAN
BY Wells & St. John
ATTYS.

INVENTOR
JERRY N. McMILLAN
BY Wells & St. John
ATTYS.

Dec. 16, 1969 J. N. McMILLAN 3,484,820
UNIFORM FINISHING MACHINE
Filed April 8, 1968 9 Sheets-Sheet 5

INVENTOR
JERRY N. McMILLAN
BY Wells & St. John
ATTYS.

United States Patent Office 3,484,820
Patented Dec. 16, 1969

3,484,820
UNIFORM FINISHING MACHINE
Jerry N. McMillan, P.O. Box 167,
Colville, Wash. 99114
Continuation-in-part of application Ser. No. 641,413,
May 8, 1967, which is a continuation-in-part of application Ser. No. 529,153, Feb. 21, 1966. This application Apr. 8, 1968, Ser. No. 725,559
Int. Cl. D06f 73/00
U.S. Cl. 223—57                                                16 Claims

ABSTRACT OF THE DISCLOSURE

A pressing machine for finishing uniforms that includes a stationary manikin for receiving the garment. Garment spreaders are mounted at the sides of the manikens for transversely stretching the garment about the manikin. The front and rear panels of the manikin are steam heated. Front and rear presser bucks move against the manikin to press the garment therebetween. The presser bucks then move down to stretch the garment about a shoulder and neck unit. The front buck is steam heated. Super-saturated steam is injected into the interior of the uniform. Forced hot air is supplied to the interior of the garment to dry the garment.

RELATED APPLICATIONS

This application is a continuation-in-part application of the application Ser. No. 641,413 filed May 8, 1967 which in turn is a continuation-in-part of a parent application filed Feb. 21, 1966, Ser. No. 529,153. Both of these applications are now abandoned.

BACKGROUND OF THE INVENTION

The present invention is embodied in a machine for finishing uniforms, such as the jackets and gowns worn by hospital nurses, attendants, doctors, laboratory workers, pharmacists, meat handlers, etc. where it is essential that the garments be laundered frequently. The finishing of such garments must be done at low cost, yet is essential for appearance, for comfort and for the continuance of the garment in service. Unless the wrinkles that occur in laundering are substantially removed, the garments wear out more quickly, are unbecoming and uncomfortable. The present invention is particularly effective in finishing uniforms containing synthetic fabrics such as polyester-cotton fabrics.

It is the purpose of the invention to provide a machine for finishing such garments as those referred to above, which embodies a stationary semi-enclosed manikin having means to support the garment on a smooth surface at the shoulders and neck with expansible spreaders located between the front and back lower portions of the manikin and provided with friction means to engage the garment at the sides to hold it down, with front and back movable presser bucks operable to stretch the front portion of the garment against the manikin and to press the lower portion of the garment against the back of the manikin and means operable while the garment is held by said spreaders and front and back presser bucks to spray super-saturated steam into the interior of the garment to remove the wrinkles therefrom before the garment is dried with forced hot air.

BRIEF DESCRIPTION OF THE DRAWINGS

The nature and advantages of my invention will appear from the following description and the accompanying drawings illustrating the preferred form of the invention. The drawings and description are intended to be illustrative only and are not intended to limit the invention except insofar as it is limited by the claims.

In the drawings.

DESCRIPTION OF THE PREFERRED EMBODIMENTS OF INVENTION

Referring now to the drawings, the machine embodying my invention comprises essentially a garment receiving manikin 1, a hollow base 2 mounting the manikin and having a lateral extension 3 which leads to a steam coil 4 that receives air from a fan 5 in a housing 6. Cooperating with the manikin 1 to hold the garments thereon are front and back presser bucks 7 and 8 and garment spreaders 9 and 10. A control pedestal 11 is provided at the front of the machine. A main steam supply conduit 12 supplies steam to the steam coil 4 and a discharge line 13 carries the steam and condensate away. An air conduit 14 supplies air under pressure to a cylinder 15 for operating the presser buck 7. It also supplies air to a cylinder 16 to operate the buck 8. The expansible spreaders 9 and 10 are operated by a pair of air jacks 45 and 46 which also receive their air from the conduit 14 (FIGURES 1, 3, 4, 5 and 11).

The manikin 1 is made up of a front stainless steel panel 18 that extends up from and is supported by the hollow base 2, a back stainless steel panel 19 also supported on the base 2, and a stainless steel formed shoulder and neck unit 20–20a that is secured to both panels 18 and 19 and connects them to each other. The lower portions of the panels 18 and 19 are connected for a short distance above the base 2 by side plates 21 and 22 to form a rectangular extension upward from the hollow base 2 for directing hot air to the interior of a garment supported on the manikin 1. The front panel 18 has an inner wall member 23 sealed thereto to provide a steam chest chamber 24 extending substantially full length of the panel 18. Steam is supplied to the upper portion of the chamber 24 by a steam pipe 25 and is drained off at the bottom by a pipe 26. The back panel 19 has an inner wall member 27 covering and sealed to the lower portion thereof, as shown clearly by FIGURES 4 and 6, to provide a steam chest chamber 28. Steam is supplied to and withdrawn from the chamber 28 by pipes 29 and 30 respectively. The neck portion 20a is a cylindrical enclosure provided with a partition 31 (FIG. 7) extending up from the bottom thereof but terminating short of the top. Steam pipes 32 and 29 provide for the supply and removal of steam from the enclosed neck portion 20a. The steam from the neck portion 20 goes to the chamber 28 through the pipe 29.

The spreaders 9 and 10 are alike and are operated together. Each spreader is composed of an elongated convex expanded metal sheet which provides a rough surface of such nature that it will frictionally hold a garment contacted therewith. The spreaders 9 and 10 are moved outward by arms 9a and 10a which are actuated by air jacks 45 and 46 and levers 47 and 48. At about the midpoint of each spreader a pair of longitudinal brackets 34 are provided. These brackets have sliding and pivoted connection with the arms 9a and 10a and are pivoted on a bar 35 and are yieldingly restrained from tilting relative to the bar by springs 36 on rods 37 and a cross bar 38 fixed on the bar 35. Each bar 35 is slidable in a guide 39 which has slots 35a for the bars 35. The guide 39 is vertically slidable in brackets 39a on the panel 18. Support bars 40 for the guide 39 are carried by a support member 41. The member 41 is a lever that is pivoted on a bracket 42 in the base 2. The other end of the support member 41 is secured to the piston rod 43 of an air cylinder 44. This cylinder is normally under air pressure to push its rod 43 down and keep the guide 39 raised up. When air is supplied to the cylinders 15 and 16, air pressure is also reduced in the cylinder 44 so the weight of the spreaders 9 and 10 and the guide 39 will cause them to move down. This pulls down on a garment held in the spreaders 9 and 10 to remove the wrinkles therein.

Figure 1:
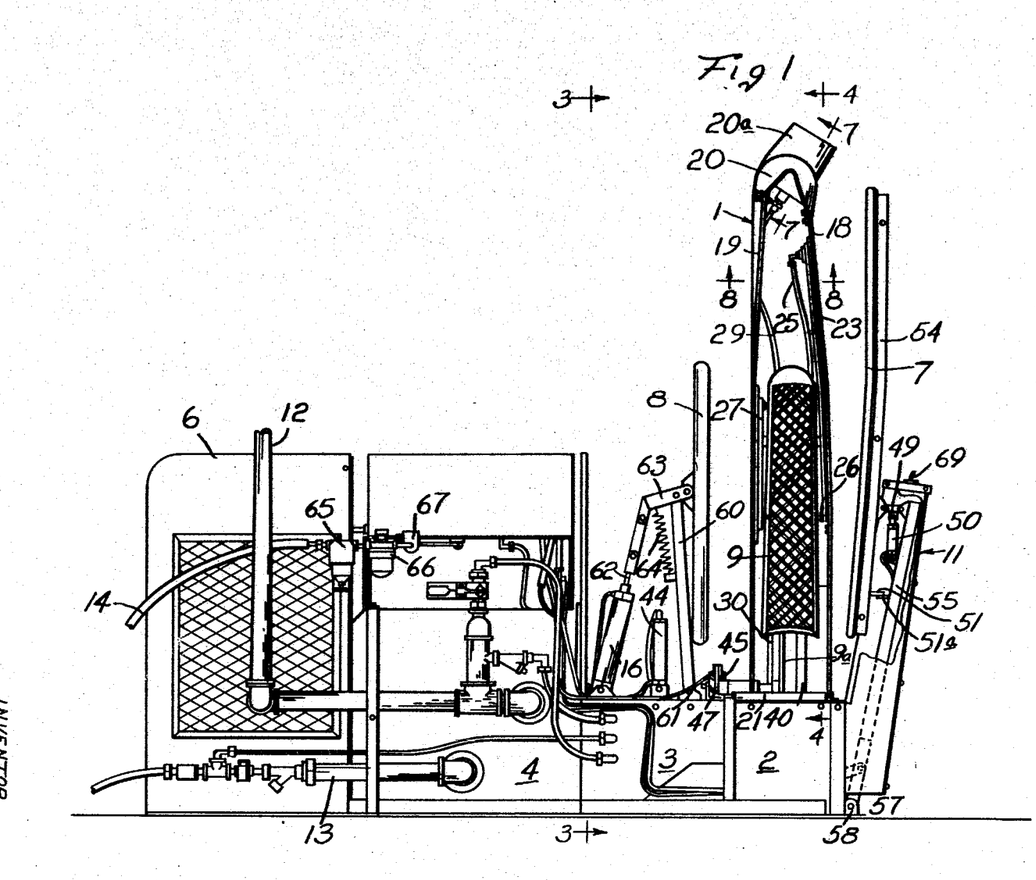
FIGURE 1 is a view in side elevation of a uniform finishing machine embodying my invention.
Figure 6:
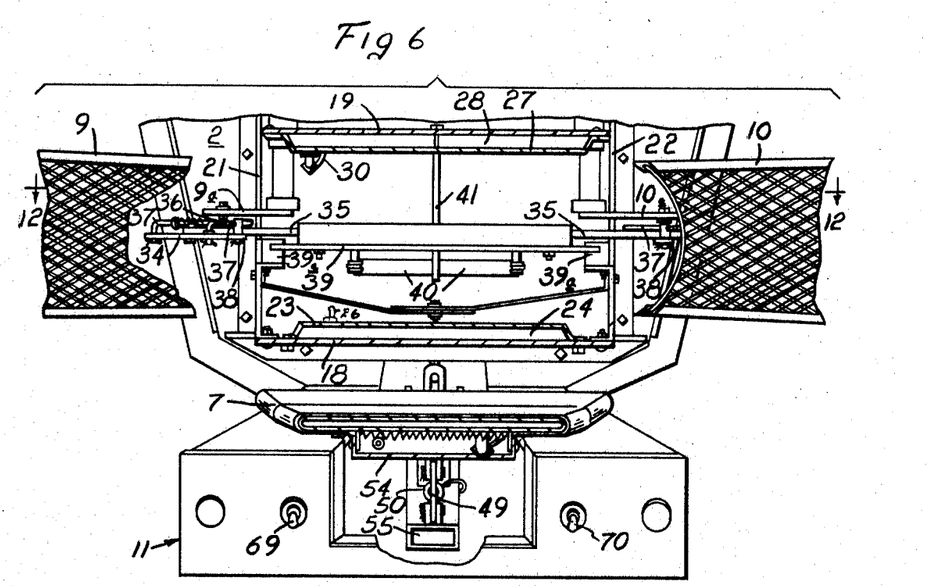
FIGURE 6 is a sectional view taken on line 6—6 of FIGURE 4.
Figure 7:
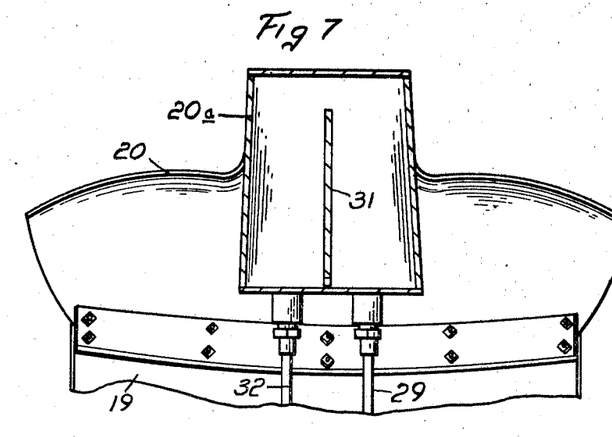
FIGURE 7 is an enlarged sectional view taken on line 7—7 of FIGURE 1.
Figure 8:
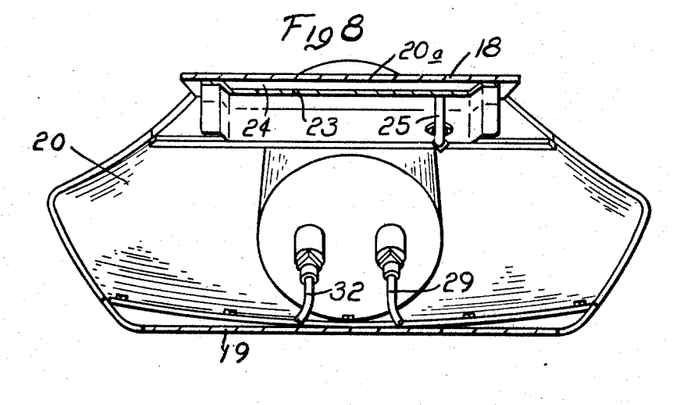
FIGURE 8 is an enlarged sectional view taken on line 8—8 of FIGURE 2.

The front presser buck 7 (FIG. 1) is mounted so it can be lowered when it is closed against the heated front panel 18. A bar 54 supports the buck 7 and is pivotally carried on a link 49 (FIGS. 1 and 6). The link 49 is pivoted on a stem 55. An air jack 50 is mounted on the stem 55 and, like cylinder 44, is normally under air pressure to hold the bar 54 at a certain raised position. When air is released from the jack 50 it allows the link 49 to pivot downwardly enabling the bar 54 and buck 7 to move down under their own weight. This downward movement is limited by stops 51, 51a on the bar 54 and the stem 55 respectively.

Figures 2, 14:
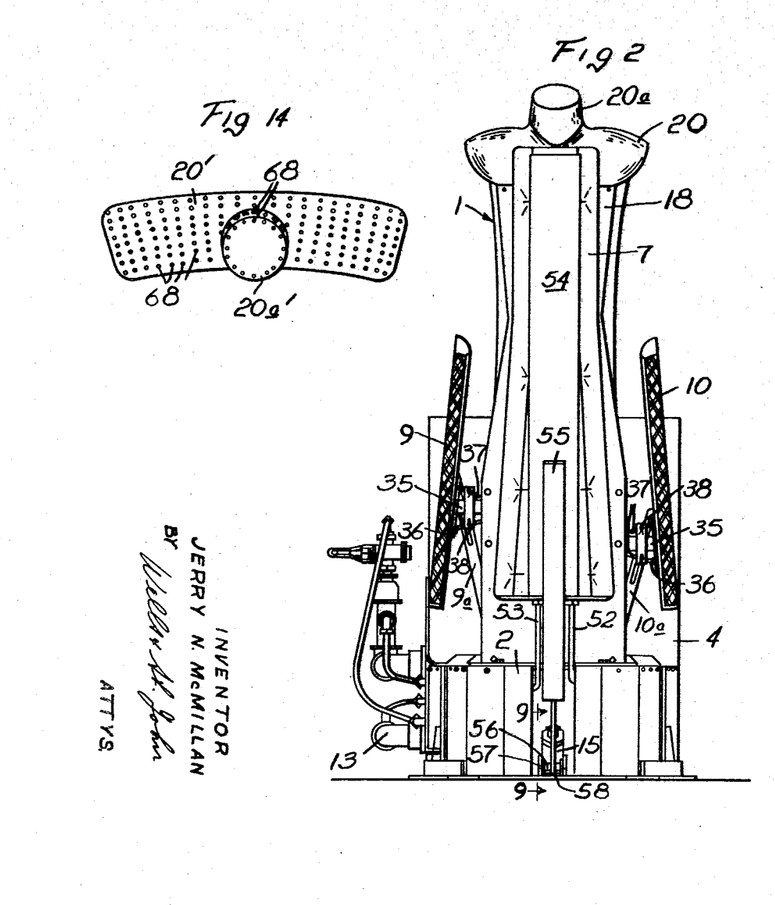
FIGURE 2 is a front view of the machine with the control pedestal removed.
FIGURE 14 is a plan view of a modification of the neck and shoulder portion of the device.
Figure 3:
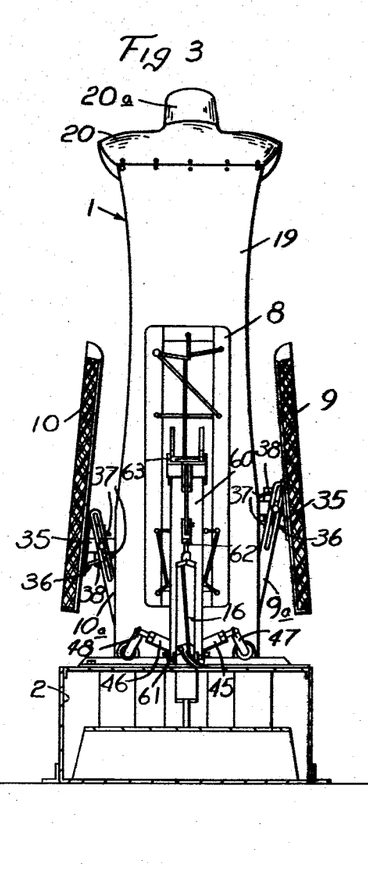
FIGURE 3 is a sectional view taken on line 3—3 of FIGURE 1, showing the rear of the manikin.
Figure 4:
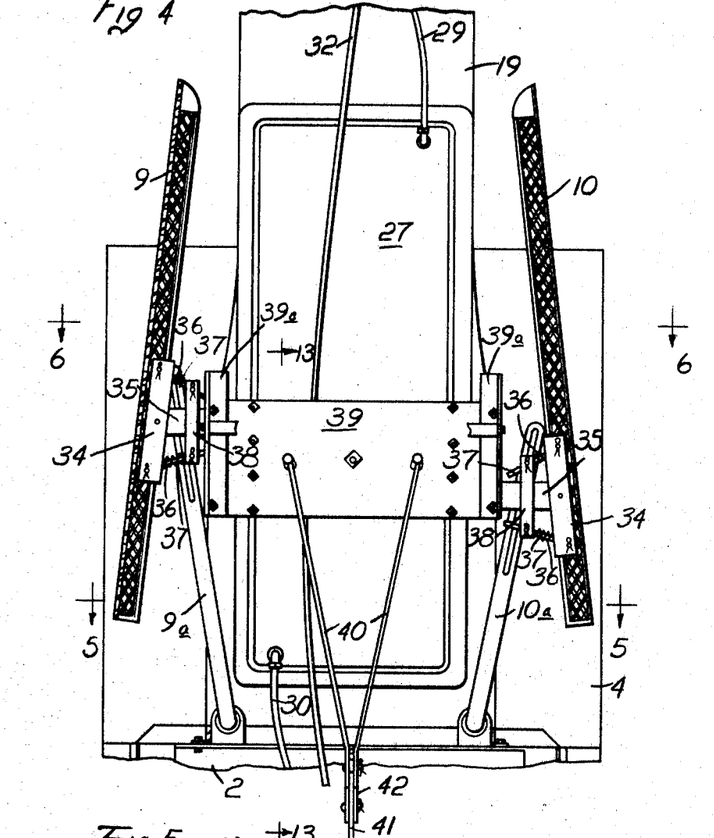
FIGURE 4 is an enlarged sectional view taken on line 4—4 of FIGURE 1.
Figure 5:
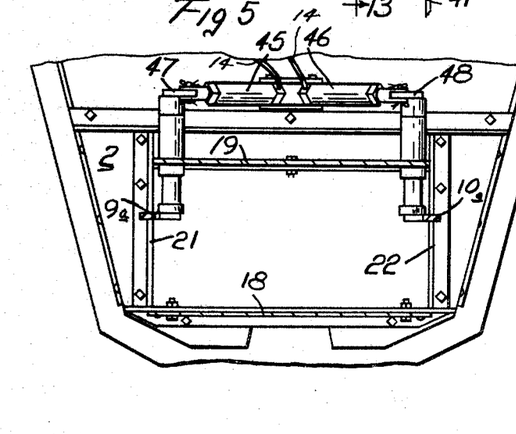
FIGURE 5 is a sectional view taken on line 5—5 of FIGURE 4.
Figure 9:
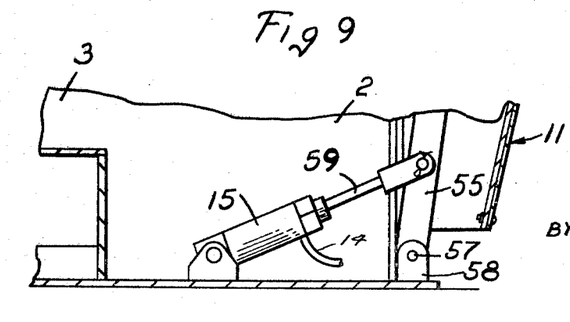
FIGURE 9 is an enlarged sectional view taken on line 9—9 of FIGURE 2.
Figure 10:
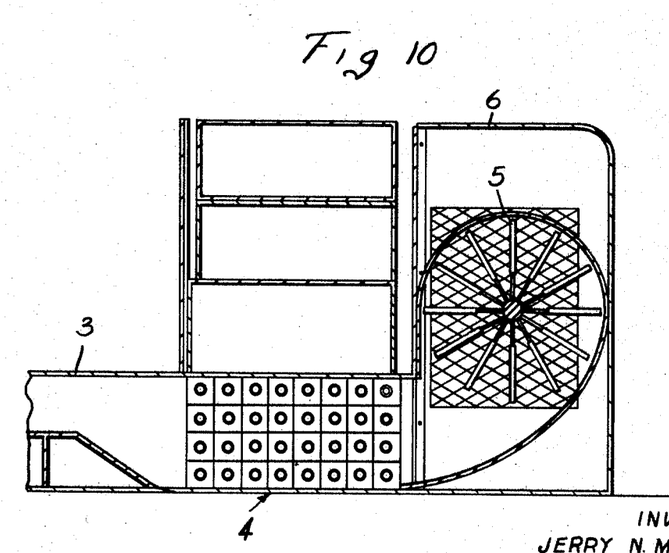
FIGURE 10 is a sectional view taken on a vertical plane centrally through the air heating and supplying means.
Figure 11:
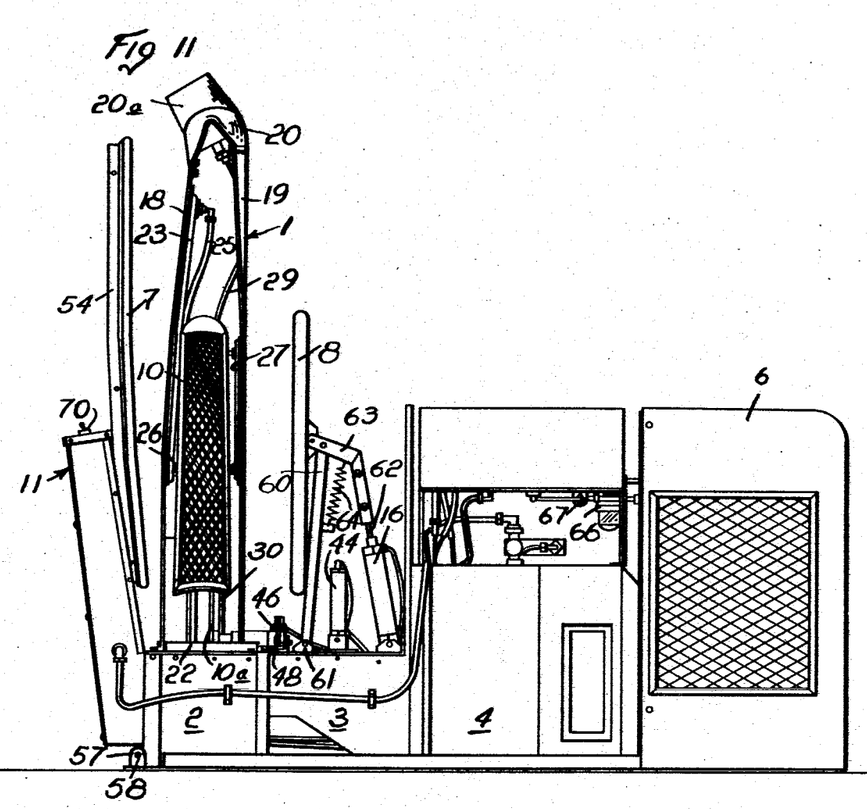
FIGURE 11 is a side view of the machine showing the side thereof opposite to that shown in FIGURE 1.
Figure 12:
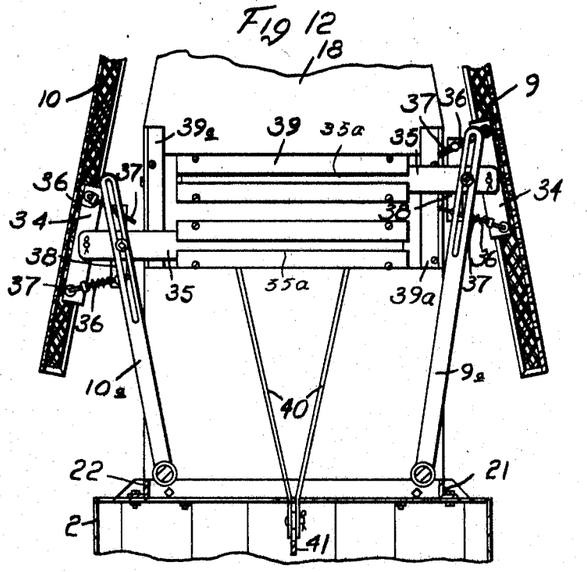
FIGURE 12 is a sectional view taken on line 12—12 of FIGURE 6.
Figure 13:
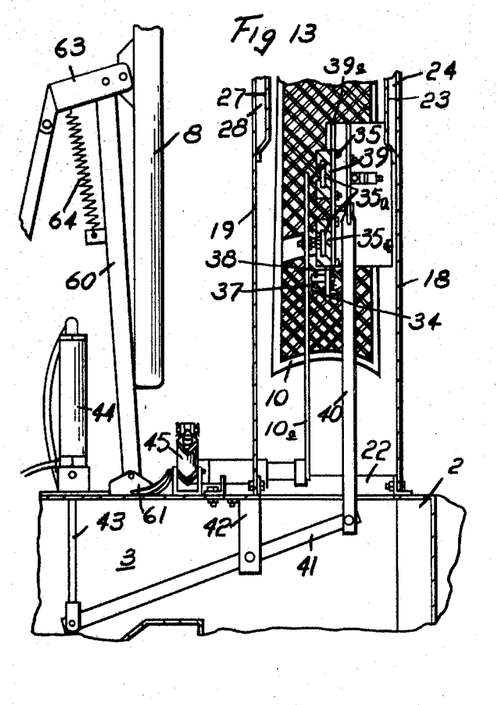
FIGURE 13 is a sectional view taken on line 13—13 of FIGURE 4.

The front presser buck 7 is hollow and is heated by steam supplied through pipes 52 and 53. This presser buck is covered with well known presser buck covering. As shown by FIGURE 2 and FIGURE 9 the stem member 55 extends down to and is secured on a sleeve 56 which is rotatably supported on a pin 57, carried by a bracket 58. The cylinder 15 has its piston rod 59 connected to the member 55 so that when air is supplied to the cylinder 15 the presser buck 7 is forced against the front panel 18 of the manikin.

The back pressure buck 8 is a short one and is not heated. It is covered with the usual covering. It is carried on an arm 60 which has its lower end pivoted in a bracket 61 on the top of the hollow member 3. The cylinder 16 has its piston rod 62 connected to the arm 60 so that when the air is supplied to the cylinder 16 the presser buck 8 is forced forward against the black panel 19 over that portion of the panel 19 that is heated. The connection comprises a lever member 63 pivoted on the arm 60, a spring 64 over balancing the buck 8 and holding it up while it closes. When the buck is closed further pressure turns the lever to urge the buck 8 downward.

Figure 17:
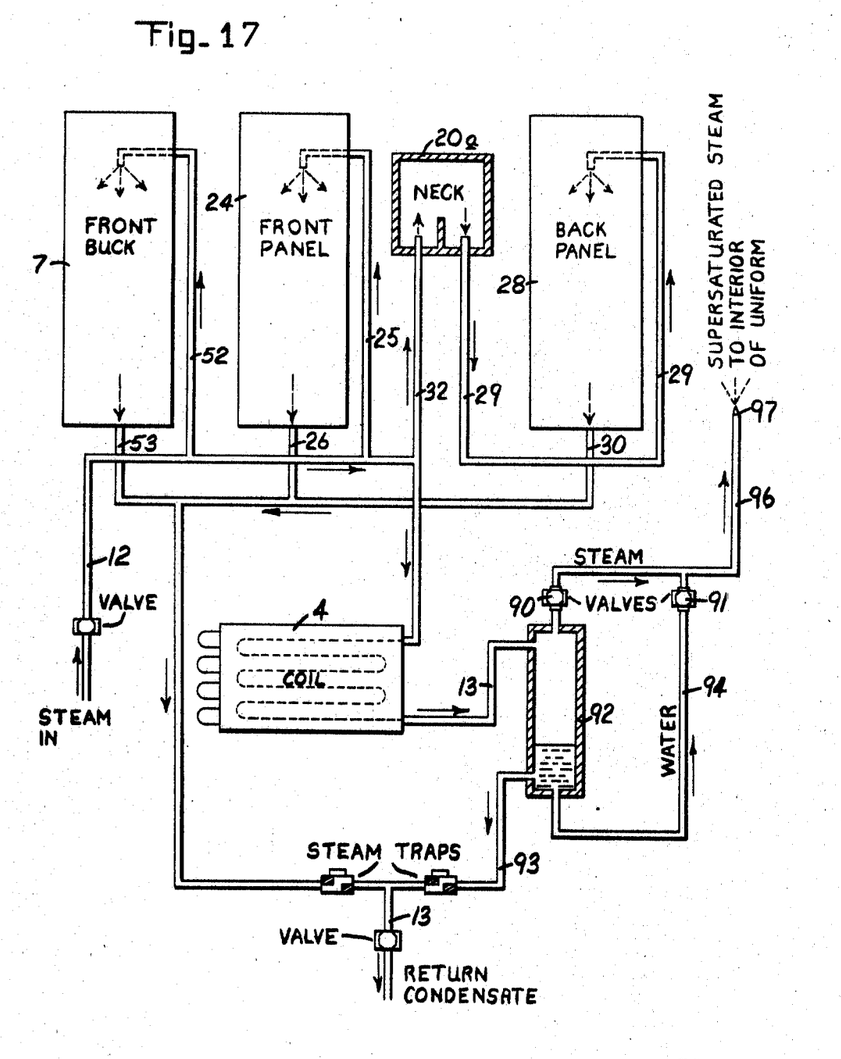
FIGURE 17 is a schematic flow diagram of the steam system of the machine.

The control pedestal 11 (FIG. 6) carries switches indicated at 69 and 70 for controlling solenoid operated valves (FIG. 1) indicated at 65, 66, 67 to supply air to the conduit 14 for the two cylinders 15 and 16 and jacks 45 and 46, and release air pressure from cylinders 44 and jack 50 for controlling valves 90 and 91 to spray supersaturated steam into the interior of the uniform (FIG. 17).

As an important part of the steam system of the machine, the return steam line empties the steam and condensate from the coil 4 into a condensate tank 92. The steam and water separate with the water settling in the bottom. The water or condensate flows from the condensate tank 92 through a water line 93. A portion of the water flows through a branch line 94 for intermixing with the steam to form supersaturated steam immediately prior to being sprayed into the interior of the garment through a line 96 and nozzle 97. The nozzle is mounted within the manikin. The flow of the supersaturated steam is controlled by the valves 90 and 91.

To finish a uniform after it has been cleaned by washing or dry cleaning, it is initially draped over the neck and shoulder forms 20–20a. If the garment is open down the front it is closed over the front panel 19. Then the valves 90 and 91 are opened to spray supersaturated steam throughout the interior of the uniform to moisten and regenerate the stiffening and body building material such as resin and starch. The steam pressure balloons the uniform outwardly to spread the parts of the garment on the manikin and lifts and extends the arms of the uniform to remove the wrinkles. After the wrinkles are removed and the stiffening material is regenerated the valves 90 and 91 are closed and air valves are opened and the fan 5 is started. Then the presser bucks 7 and 8 close and drop. The fan forces air through the coil 4 through the members 3 and 2 up into the interior of the uniform. The air is continued until the garment is dry when reversing the switches will effect stopping the fan and release of the presser bucks and the spreaders. The garment can then be removed and another one put on the manikin.

While I have described the unit 20–20a as steam heated, this need not be done. By perforating this unit as indicated in FIGURE 14 the hot air circulation can be made to dry the neck and shoulder part of the garment without the steam heating of the manikin's neck. The portions 20' and 20a' are shown in FIGURE 14 with many small perforations.

Figures 15, 16:
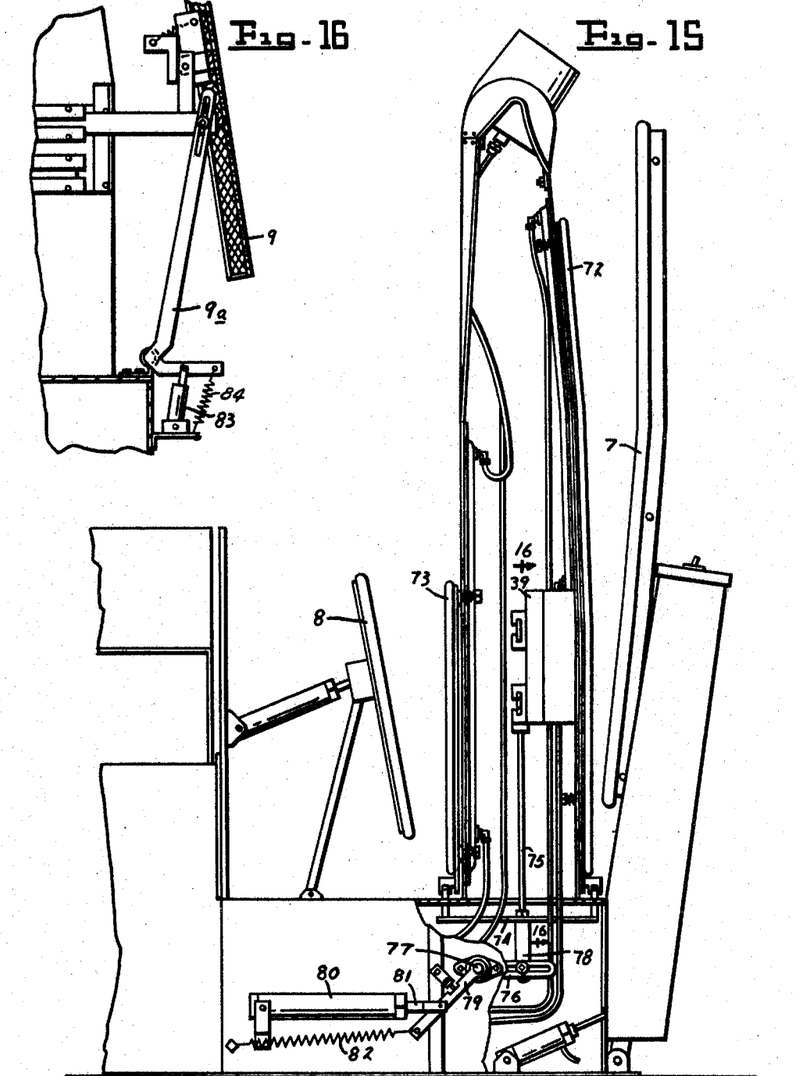
FIGURE 15 is a side view of a modified form of the invention.
FIGURE 16 is a fragmentary sectional view on the line 16—16 of FIGURE 15.

In FIGURES 15 and 16 there is shown, somewhat diagrammatically, a modification of the finishing device which is also used. This modification has the spreader carrying frame 39 sliding in ways 39a provided on the manikin base. Two pads 72 and 73 for the front and back are also mounted on the exterior of the manikin base so they can be moved up and down slightly. A cross member 74 connects the lower ends of the pads and a stem 75 extends down from the wing carrying frame 39 and supports this frame on the cross member 74. An arm 76 is secured on a shaft 77 which is journalled in the base 2 of the machine. The arm 76 is coupled to the cross member 74 by a member 78. A second arm 79 is fixed to the shaft 77 and it in turn connects to the piston rod 81 of a jack 80. A spring 82 retracts the piston rod 81 when air is cut off from the jack 80.

When the manikin has a garment placed thereon and the cycle is started, the bucks 7 and 8 close in. The air is cut off from jack 80 and the spring 82 starts to retract the piston rod 81. This action rocks the shaft 77 and through the arm 76 and member 78 the cross member 74 is lowered slightly when the front and back bucks close. These bucks also drop in the manner previously described. The result is a stretching of the garment downwardly to remove the horizontally running wrinkles therein before the pressure is fully applied. Since the spreaders 9 and 10 are spread by the arms 9a and 10a, the garment is thus initially stretched lightly both in a horizontal and in a vertical direction and then pressed and dried.

The arms 9a in FIGURE 16 is somewhat different from that shown in the main form of the invention to allow for the use of a slightly different mounting for the jacks 83 and a spring 84. The jacks 83 push the spreaders 9 and 10 in and the spring 84 spreads them outwardly.

It is believed that the nature and advantages of my invention will be apparent from the foregoing description.

The embodiment of the invention, in which an exclusive property or privilege is claimed, is defined as follows:

1. A machine for pressing and finishing garments comprising
   (a) a base;
   (b) a manikin mounted upright on the base, and manikin having a front panel and a back panel and a shoulder and neck supporting form above said panels;
   (c) a pair of garment spreaders between the panels and movable outwardly beyond the panels;
   (d) a heated front pressing buck mounted in front of the manikin and movable toward and away from the front panel;
   (e) first drive means for moving the front pressing buck toward the front panel to hold a uniform on the manikin and for pressing the front portion of the uniform between the front panel and the front buck;
   (f) second drive means for moving the garment spreaders outwardly after the front pressing buck is moved toward the front panel to stretch the garment about the manikin to remove the wrinkles; and
   (g) means to force heated air upwardly from the base between the panels to dry the uniform.

2. The machine as defined in claim 1 further comprising a back pressing buck mounted in back of and movable toward and away from the back panel for engaging the back portion of the uniform therebetween and wherein the first drive means moves the back pressing buck toward the back panel in unison with the front pressing buck.

3. The machine as defined in claim 1 wherein the garment spreaders are mounted on the manikin for up and down movement and wherein the machine further comprises means for moving the garment spreaders downward after the spreaders have been moved outwardly to securely grip the uniform to stretch the garment about the shoulder and neck form.

4. The machine as defined in claim 1 wherein each of the garment spreaders is elongated with a convex shape and is provided with a rough surface that will frictionally hold a uniform contacted therewith.

5. The machine as defined in claim 1 wherein the neck and shoulder supporting form is provided with passages for the upward flow of air therethough to finish the neck and shoulder portion of the garment.

6. The machine as defined in claim 1 further comprising means for forcing steam up into the interior of the uniform to condition the uniform prior to forcing air into the garment.

7. The machine defined in claim 1 wherein the front pressing buck is mounted for up and down movement; and
   means to raise the front pressing buck.

8. The machine defined in claim 1 wherein the back pressing buck is mounted for up and down movement; and
   means to lower said back pressing buck when it is pressing against the back panel.

9. The machine defined in claim 1 further comprising a first pad movably mounted on the exterior of said front panel for up and down movement and drive means mounted on said machine and connected to the front pad for moving the front pad to stretch the uniform about the shoulder and neck form.

10. The machine defined in claim 9 further comprising a back pad movably mounted on the exterior of said back panel for up and down movement and wherein said drive means is connected to the back pad to move the back pad simultaneously with the movement of the front pad to stretch the uniform about the shoulder and neck form.

11. The machine defined in claim 1 wherein the garment spreaders are movable up and down and wherein the machine further comprises (1) a front pad movably mounted on the exterior of said front panel for receiving the front pressing buck, (2) a back pad movably mounted on said back panel and (3) a drive means connected with the garment spreaders and the front and back pads for moving the spreaders and pads downwardly to stretch the garment about the shoulder and neck forms.

12. The machine as defined in claim 11 wherein the front and back pressing bucks are movable up and down and wherein the moving means for the pressing bucks move the buck downwardly after the bucks move toward the panels in coordination with the downward movement of the spreaders and the pads.

13. The machine as defined in claim 1 wherein the garment spreaders are elongated convex sheet members that are pivotally mounted on horizontal bars (35) slidably mounted in a vertical movable guide (39); a vertical bar (38) is affixed to each of the horizontal bars (35) for supporting spring mechanisms that extend from the ends of the bars (38) to the spreaders for resiliently supporting the spreaders in a tilting position to facilitate the mounting of the garments and for enabling the spreaders to apply a uniform stretching force to the mounted garment.

14. The machine as defined in claim 13 wherein the machine further comprises a drive means connected to the guide (39) for moving the guide up and down to move the spreaders up and down to stretch the garments about the shoulder and neck form.

15. The machine as defined in claim 1 further comprising means for spraying supersaturated steam into the interior of a garment mounted on the manikin.

16. The machine as defined in claim 11 further comprising means for spraying supersaturated steam into the interior of a garment mounted on the manikin while the garment spreaders and front and back pads move downwardly.

References Cited

UNITED STATES PATENTS

| | | | |
|---|---|---|---|
| 2,587,745 | 4/1952 | Maurer | 223—70 |
| 2,841,315 | 7/1958 | Paris | 223—70 |
| 2,969,897 | 1/1961 | Paris | 223—70 X |
| 3,216,633 | 11/1965 | Paris | 223—70 |

MERVIN STEIN, Primary Examiner

GEORGE V. LARKIN, Assistant Examiner